US012627669B1

(12) United States Patent
    Yarkoni et al.

(10) Patent No.:    US 12,627,669 B1
(45) Date of Patent:        May 12, 2026

(54) COMPONENT FOR MANAGING ACCESS TO INTERNAL RESOURCES

(71) Applicant: Cyolo Security Ltd, Ramat-Gan (IL)

(72) Inventors: Dedi Yarkoni, Ramat-Gan (IL); Eran Shmuely, Tel Aviv (IL)

(73) Assignee: Cyolo Security Ltd, Ramat-Gan (IL)

( * ) Notice: Subject to any disclaimer, the term of this patent is extended or adjusted under 35 U.S.C. 154(b) by 0 days.

(21) Appl. No.: 19/250,136

(22) Filed: Jun. 26, 2025

(51) Int. Cl.
    *H04L 9/40*        (2022.01)
    *H04L 67/025*        (2022.01)
(52) U.S. Cl.
    CPC ........ *H04L 63/101* (2013.01); *H04L 63/0435* (2013.01); *H04L 63/102* (2013.01); *H04L 67/025* (2013.01)
(58) Field of Classification Search
    CPC .. H04L 9/3247; H04L 9/3268; G06F 21/6218
    See application file for complete search history.

(56)            References Cited

U.S. PATENT DOCUMENTS

| | | | | |
|---|---|---|---|---|
| 6,865,157 | B1 * | 3/2005 | Scott ....................... | H04L 41/00 |
| | | | | 370/242 |
| 7,664,043 | B1 * | 2/2010 | D'Souza ................. | H04L 43/10 |
| | | | | 370/242 |
| 7,839,862 | B1 * | 11/2010 | Aggarwal ........... | H04L 12/4633 |
| | | | | 370/395.5 |
| 8,141,143 | B2 * | 3/2012 | Lee ........................ | H04L 63/102 |
| | | | | 726/11 |
| 8,914,410 | B2 * | 12/2014 | Hannel ................. | H04L 63/105 |
| | | | | 707/E17.014 |
| 9,100,271 | B2 * | 8/2015 | Yang ................... | H04L 12/5692 |
| 9,419,942 | B1 * | 8/2016 | Buruganahalli ........ | H04L 63/20 |
| 9,893,968 | B1 * | 2/2018 | Nagargadde ........... | H04L 41/12 |
| 11,025,635 | B2 * | 6/2021 | Patterson .............. | H04L 63/102 |
| 11,240,242 | B1 * | 2/2022 | Celik .................. | H04L 12/4633 |
| 11,283,690 | B1 * | 3/2022 | Mosier ................... | H04L 41/22 |
| 11,531,735 | B1 * | 12/2022 | Patel ..................... | G06F 21/316 |
| 11,575,541 | B1 * | 2/2023 | Styszynski .......... | H04L 12/4633 |
| 11,792,153 | B1 * | 10/2023 | Pamu ................. | H04L 61/2514 |
| | | | | 370/392 |
| 12,113,666 | B1 * | 10/2024 | Xu ........................ | H04L 9/0825 |

(Continued)

*Primary Examiner* — Jason Chiang

(57)            ABSTRACT

A system for providing secure remote access to an internal resource hosted by a target computing environment, comprising: a component designed for installation at the target computing environment configured for: publishing on a cloud platform in communication with the target computing environment, external routes to the internal resource hosted by the target computing environment, wherein the cloud platform routes a request to the component according to the published external routes, the request generated by a client terminal for accessing the internal resource, authenticating and/or authorizing the request against an access policy managed by the component for accessing the internal resource, in response to the authentication and/or authorization, establishing a remote access session according to the request, between the client terminal and the component managing the internal resource via the cloud platform over an encrypted connection, and decrypting traffic received over the established remote access session running on the encrypted connection.

19 Claims, 7 Drawing Sheets

(56) References Cited

U.S. PATENT DOCUMENTS

| | | | |
|---|---|---|---|
| 2004/0225879 | A1* | 11/2004 | Nelson .................... H04L 63/18 |
| | | | 713/153 |
| 2007/0061460 | A1* | 3/2007 | Khan ................. H04L 63/0428 |
| | | | 709/225 |
| 2007/0088834 | A1* | 4/2007 | Litovski ............. H04L 63/0272 |
| | | | 709/227 |
| 2007/0254630 | A1* | 11/2007 | Moloney ................ H04L 63/06 |
| | | | 455/410 |
| 2010/0131654 | A1* | 5/2010 | Malakapalli ........... H04L 67/08 |
| | | | 709/227 |
| 2015/0150114 | A1* | 5/2015 | Kuker ................ H04L 12/4641 |
| | | | 726/14 |
| 2016/0112472 | A1* | 4/2016 | Pugalia .............. H04L 65/1093 |
| | | | 709/204 |
| 2017/0304727 | A1* | 10/2017 | Gallizzi ................ A63F 13/493 |
| 2018/0041445 | A1* | 2/2018 | Way .................... H04L 43/0817 |
| 2018/0063080 | A1* | 3/2018 | Lehmann ................ H04L 41/28 |
| 2018/0139130 | A1* | 5/2018 | Crickett .................. H04L 45/64 |
| 2018/0255142 | A1* | 9/2018 | Benantar .............. H04L 67/562 |
| 2018/0321861 | A1* | 11/2018 | Rao ........................ G06F 3/065 |
| 2019/0251246 | A1* | 8/2019 | Sondhi ............... H04L 63/0807 |
| 2019/0258756 | A1* | 8/2019 | Minwalla .............. G06N 20/00 |
| 2019/0372930 | A1* | 12/2019 | Discenza ........... H04L 63/1416 |
| 2020/0342465 | A1* | 10/2020 | Ruddell .................. G06F 16/13 |
| 2021/0103831 | A1* | 4/2021 | Chu ........................ G06N 5/04 |
| 2021/0377252 | A1* | 12/2021 | Monro ............... H04L 63/0884 |
| 2021/0385225 | A1* | 12/2021 | Guionneau ........... H04L 9/3271 |
| 2021/0407669 | A1* | 12/2021 | Fish ...................... G06T 7/0012 |
| 2022/0067713 | A1* | 3/2022 | Tietz ...................... G06F 9/546 |
| 2022/0183003 | A1* | 6/2022 | Wei ....................... H04L 5/0092 |
| 2022/0191288 | A1* | 6/2022 | Harshith .............. H04L 67/141 |
| 2022/0197669 | A1* | 6/2022 | Xu .......................... G06F 9/452 |
| 2022/0284822 | A1* | 9/2022 | Mujumdar .......... H04W 36/322 |
| 2022/0321668 | A1* | 10/2022 | Gunasekaran ...... H04L 63/0823 |
| 2022/0326994 | A1* | 10/2022 | Mueller .............. G06F 21/6218 |
| 2022/0329576 | A1* | 10/2022 | Nikam ............... H04L 63/0272 |
| 2023/0012609 | A1* | 1/2023 | Wang .................... H04L 43/028 |
| 2023/0254360 | A1* | 8/2023 | Garcia ................... H04L 67/12 |
| | | | 715/740 |
| 2023/0362056 | A1* | 11/2023 | Lucas ................. H04L 41/0813 |
| 2023/0362173 | A1* | 11/2023 | Dalton ............... H04W 12/121 |
| 2023/0409357 | A1* | 12/2023 | He ...................... G06F 9/45558 |
| 2024/0154986 | A1* | 5/2024 | Jiang ...................... H04L 63/20 |
| 2024/0187221 | A1* | 6/2024 | Nagaraja .............. H04L 9/0838 |
| 2024/0323193 | A1* | 9/2024 | Hadash ................. H04L 63/20 |
| 2024/0430231 | A1* | 12/2024 | Hegde ................... H04W 76/14 |
| 2025/0080537 | A1* | 3/2025 | Sawant ................... H04L 63/10 |
| 2025/0094211 | A1* | 3/2025 | Spittle ..................... H04R 5/04 |
| 2025/0220040 | A1* | 7/2025 | Chesla ............... H04L 63/1458 |

* cited by examiner

7/7

COMPONENT FOR MANAGING ACCESS TO INTERNAL RESOURCES

BACKGROUND

The present invention, in some embodiments thereof, relates to security of internal resources and, more specifically, but not exclusively, to systems and method for managing access to internal resources.

Secure remote access to internal resources while preventing unauthorized access and data breaches is required. Traditional VPNs and access control methods often lack flexibility and scalability. Emerging solutions integrate identity-based authentication, dynamic policies, and zero-trust principles to enhance security. Efficient management of remote access reduces risks and improves user experience.

SUMMARY

According to a first aspect, a system for providing secure remote access to an internal resource hosted by a target computing environment, comprising: at least one processor executing code of a component designed for installation at the target computing environment, comprising instructions for: publishing on a cloud platform in communication with the target computing environment, external routes to the internal resource hosted by the target computing environment, wherein the cloud platform routes a request to the component according to the published external routes, the request generated by a client terminal for accessing the internal resource, authenticating and/or authorizing the request against an access policy managed by the component for accessing the internal resource, in response to the authentication and/or authorization, establishing a remote access session according to the request, between the client terminal and the component managing the internal resource via the cloud platform over an encrypted connection, and decrypting traffic received over the established remote access session running on the encrypted connection.

According to a second aspect, a computer implemented method for providing secure remote access to an internal resource hosted by a target computing environment, comprising: using at least one processor executing code of a component designed for installation at the target computing environment, comprising instructions for: publishing on a cloud platform in communication with the target computing environment, external routes to the internal resource hosted by the target computing environment, wherein the cloud platform routes a request to the component according to the published external routes, the request generated by a client terminal for accessing the internal resource, authenticating and/or authorizing the request against an access policy managed by the component for accessing the internal resource, in response to the authentication and/or authorization, establishing a remote access session according to the request, between the client terminal and the component managing the internal resource via the cloud platform over an encrypted connection, and decrypting traffic received over the established remote access session running on the encrypted connection.

According to a third aspect, a non-transitory medium storing program instructions for providing secure remote access to an internal resource hosted by a target computing environment, which when executed by at least one processor of a component designed for installation at the target computing environment, cause the at least one processor to: publish on a cloud platform in communication with the target computing environment, external routes to the internal resource hosted by the target computing environment, wherein the cloud platform routes a request to the component according to the published external routes, the request generated by a client terminal for accessing the internal resource, authenticate and/or authorize the request against an access policy managed by the component for accessing the internal resource, in response to the authentication and/or authorization, establish a remote access session according to the request, between the client terminal and the component managing the internal resource via the cloud platform over an encrypted connection, and decrypt traffic received over the established remote access session running on the encrypted connection.

In a further implementation form of the first, second, and third aspects, the cloud platform directs the encrypted traffic over the encrypted connection between the client terminal and the component of the target computing environment without decryption at the cloud platform, wherein decryption is performed by the component at the target computing environment.

In a further implementation form of the first, second, and third aspects, data from the internal resource for sending over the established remote access session running on the encrypted connection is encrypted by the component without encryption occurring at the cloud platform.

In a further implementation form of the first, second, and third aspects, the component is configured for managing remote access for individual internal resources.

In a further implementation form of the first, second, and third aspects, the request is associate with an identity of a specific user, and the authenticating and/or authorizing is for the identity associated with the request.

In a further implementation form of the first, second, and third aspects, the cloud platform monitors network level attacks against the encrypted connection passing through the cloud platform.

In a further implementation form of the first, second, and third aspects, the request is generated in response to a click on the internal resource presented within an application portal on a display of the client terminal, and wherein access to the internal resource is established in response to the click.

In a further implementation form of the first, second, and third aspects, the authentication is performed against a selected identity provider of a plurality of identity providers defined by the component, the plurality of identity providers installed at the target computing environment and/or installed at the cloud platform, wherein different requests for different internal resources are authenticated by different identity provides as defined by the component.

In a further implementation form of the first, second, and third aspects, private and/or sensitive data is hosted by the component and/or hosted by the target computing environment and excluded from being hosted by the cloud platform.

In a further implementation form of the first, second, and third aspects, the component is configured for managing access to at least one internal resource hosted by the target computing environment.

In a further implementation form of the first, second, and third aspects, further comprising continuously monitoring and/or logging the established remote access session by the component.

In a further implementation form of the first, second, and third aspects, network ports of the component are maintained in a closed and opened in response to the authentication and/or authorization for establishing the remote access session.

In a further implementation form of the first, second, and third aspects, further comprising a plurality of components installed in a plurality of target computing environments hosting a plurality of internal resources, wherein the plurality of components communicate with each other via the cloud platform.

In a further implementation form of the first, second, and third aspects, further comprising at least one router configured for communication with at least one component, and at least one upstream router configured for communication with at least one component and/or router, wherein each component is configured for communication with a single upstream router and a router is configured for communication with a single upstream router.

In a further implementation form of the first, second, and third aspects, each respective router sends a list of internal resources being managed by the respective router to the upstream router for which the respective router is configured to communicate with, wherein each upstream router verifies the internal resources sent by each respective router.

In a further implementation form of the first, second, and third aspects, for each respective router configured for communication with an upstream router, the router sends to the upstream router a list of internal resources managed by components configured to communicate with the respective router, wherein the upstream router verifies the list of internal resources.

In a further implementation form of the first, second, and third aspects, a router receives the request from the client terminal and obtains an indication for routing the request to the component and closes a circuit in response to the SNI matching an authenticated connection, or the router sends the request to the upstream router and the upstream router checks for a router to route the request, or the router terminates the connection when no router to route the request is found.

In a further implementation form of the first, second, and third aspects, data exchange and/or decision making between the plurality of components are performed via a consensus process.

In a further implementation form of the first, second, and third aspects, in response to failure of a first component of the plurality of internal resources managing access to the internal resource, a second component configured in association with the internal resource is triggered for taking over functions of the first component for performing the authenticating and/or authorizing and for establishing the remote access session for the internal resource.

In a further implementation form of the first, second, and third aspects, at least two components of the plurality of components are associated with at least two different internal resources on at least two different target computing environments, the at least two components are configured as VPN termination points, and a VPN is established between the at least two components configured as VPN termination points.

In a further implementation form of the first, second, and third aspects, in response to a click on a SSH application by the client terminal, the component performs the authentication and/or authorization with respect to the policy and presents a one-time key generated from a server key and a session key, the component sends the one-time key to the cloud platform, the client terminal opens a connection from a native client running on the client terminal and provides the one-time key, and the cloud platform directs the connection based on the server key, and the component performs authentication based on a predefined configuration.

In a further implementation form of the first, second, and third aspects, the component further includes code for being configured as a secure termination and routing point for providing a remote-access session for the client terminal for accessing the internal resource, the component further includes code for establishing the remote-access connection via at least one of: a VPN, a hardware gateway, and a secure remote-access protocol, wherein the component securely routes traffic originating from the client terminal.

In a further implementation form of the first, second, and third aspects, the component further includes code for monitoring and/or logging and/or providing real-time visibility and/or granular administrative control over the remote-access session originating from the client terminal, wherein the component further includes code for limiting remote access by the client terminal exclusively to at least one of: authorized internal resources, applications, IP addresses, ports, session identifiers, user identities, wherein the component further includes code for enabling proactive and/or immediate termination of unauthorized and/or suspicious remote-access sessions.

In a further implementation form of the first, second, and third aspects, further comprising at least one software-defined routing component positioned externally to the component and configured to dynamically route incoming remote access connections from at least one of: the VPN, the hardware gateway, and the remote-access protocol, directly to one or more relevant 20) components based on at least one of: predefined routing rules, connection attributes, policies, and session characteristics managed and/or enforced by the component.

In a further implementation form of the first, second, and third aspects, the component further includes code for: automatically enforcing Layer 2 micro-segmentation within the target computing environment for at least one internal resource hosted thereon, by programmatically identifying access switch ports connected to internal hosts, and automatically configuring one or more access switches to assign the identified host ports of the internal hosts to an isolated secondary VLAN within a Private VLAN (PVLAN) structure, thereby preventing direct Layer 2 communication between internal hosts.

In a further implementation form of the first, second, and third aspects, the component further includes code for designating one or more uplink ports connected to the component as promiscuous ports of the PVLAN structure, such that all Layer 2 traffic originating from the isolated ports is forwarded to the component.

In a further implementation form of the first, second, and third aspects, the component further includes code to: implement a proxy ARP mechanism to respond to Address Resolution Protocol (ARP) requests issued by internal hosts on behalf of other internal hosts, thereby ensuring that intrasubnet communication is redirected to the component, receive all intra-subnet Layer 2 traffic originating from the isolated ports via a promiscuous port, apply one or more access control policies to each received packet, and based on the applied policy at least one of: forward the packet to the intended destination internal host if the policy permits, drop the packet if the policy denies communication between the internal hosts, and forward outbound traffic destined to external networks over an encrypted connection.

In a further implementation form of the first, second, and third aspects, the component is further configured for enforcing dynamic routing to the internal resource by: intercepting a domain name system (DNS) resolution request issued by the client terminal for domain names, in response to the DNS resolution request matching a rule or pattern, resolving the domain name to at least one internet protocol (IP) address, dynamically injecting at least one host-specific IP route corresponding to the resolved at least one IP address into a routing table of the client terminal and/or a network element under control of the component, and wherein traffic destined to the resolved IP address is dynamically redirected through a secure tunnel established by the component.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
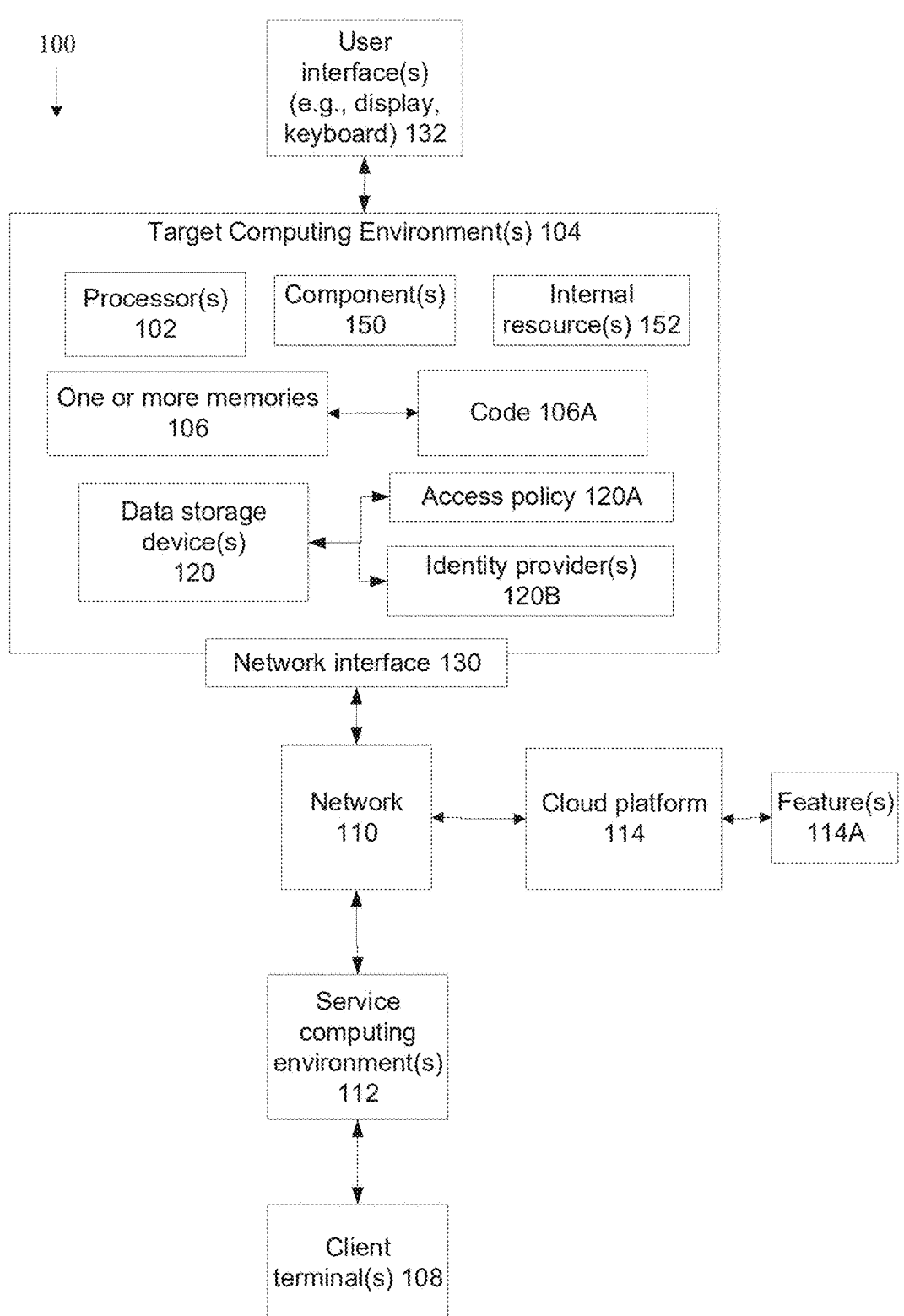
FIG. 1 is a block diagram of components of a system that includes at least one component for providing secure access to at least one internal resource hosted by a target computing environment, in accordance with some embodiments of the present invention.

The present invention, in some embodiments thereof, relates to security of internal resources and, more specifically, but not exclusively, to systems and method for managing access to internal resources.

As used herein, the term target computing environment refers to the computing environment that hosts one or more internal resource(s) for which access is managed by a component, as described herein.

As used herein, the term service computing environment refers to the computing environment from which access to the internal resource(s) hosted by the target computing environment is requested. Client terminals may attempt to access the internal resource(s) via the service computing environment (e.g., implemented as a server), or directly (in which case the client terminal is the service computing environment).

As used herein, the term component may be interchanged with the term Decentralized Identity Access Controllers (IDAC)).

An aspect of some embodiments of the present invention relates to a component implemented within systems, methods, computing devices, and/or code instructions (e.g., stored on a data storage device and executable by one or more processors) for providing secure remote access by a service computing environment (e.g., client terminal) to an internal resource hosted by a target computing environment (e.g., server). A processor executes code of the component for publishing external routes to the internal resource hosted by the target computing environment. The external routes are published on a cloud platform in communication with the target computing environment. Private and/or sensitive data is hosted by the component and/or hosted by the target computing environment and excluded from being hosted by the cloud platform. The cloud platform routes a request to the component according to the published external routes. The request is generated by the service computing environment (e.g., client terminal) for accessing the internal resource. The component authenticates and/or authorizes the request against an access policy managed by the component for accessing the internal resource. In response to the authentication and/or authorization, the component establishes a session according to the request, between the client terminal and the component managing the internal resource via the cloud platform. The session is run over an encrypted connection. Traffic is encrypted at the client terminal end. The cloud platform directs the encrypted traffic over the encrypted connection between the client terminal and the component without decryption at the cloud platform. The component decrypts the encrypted traffic received over the established session running on the encrypted connection.

Optionally, multiple components are deployed in multiple computing environments hosting multiple different internal resources. The components communicate with each other via the cloud platform. Data exchange and/or decision making between the components may be performed via a consensus process.

The multiple components may be arranged in a distributed manner, for avoiding a central point of failure (which would otherwise occur for example where the cloud platform performs central authentication for remote access). Redundancy for failure of a first component may be provided by a second component.

Optionally, at least two components associated with different internal resources on different target computing environments are configured as VPN termination points. A VPN may be established between the components configured as VPN termination points.

At least one embodiment described herein addresses the technical problem of providing improved security to internal resources which are being remotely accessed. The technical problem may relate to providing more efficient and/or scalable access to the internal resources, for example, in terms of computational resources, memory, and/or processing time. At least one embodiment described herein improves the technology and/or the technical field of providing improved security to internal resources which are being remotely accessed. At least one embodiment described herein improves over existing approaches for providing improved security to internal resources which are being remotely accessed, for example, security service edge (SSE). SSE is a collection of integrated, cloud-centric security capabilities that facilitates safe access to websites, software-as-a-service (SaaS) applications and private applications. SEE-related security capabilities include, for example, Zero Trust Network Access (ZTNA), Cloud secure web gateway (SWG), Cloud access security broker (CASB), and Firewall-as-a-service (FWaaS). At least one embodiment described herein provides the practical application of improved security to internal resources which are being remotely accessed and/or providing more efficient and/or scalable access to the internal resources.

In prior approaches, different cyber security products were consolidated under one platform. User-To-Resource solutions were consolidated under SSE with three main domains: 1. User to private applications; 2. User to internet resources; and 3. User to Saas applications. What resulted were patched solutions instead of an integrated platform, which compromised both on security and on performance. Most solutions were evolved from two products: SSL (secure socket layer) proxies evolved to service initiated zero trust network access (ZTNA), and VPNs (virtual private networks) evolved to client initiated ZTNA.

Both of the aforementioned solutions are based on a connector that exists near the internal (e.g., private) resources, but instead of accepting requests, the connector is reaching out to a cloud managed gateway, and forming a secure tunnel. Users are forming a secure channel with the gateway (using the browser in Service-Initiated flow or using a dedicated client in the Client-Initiated flow). The gateway verifies the identity of the user (mainly using a 3'" party IDP), verifies the access request, sometimes verifies the content of the request, and if everything is in order, the gateway will tunnel the request to the connector, and from the connector the request will be sent to the destination.

The aforementioned approaches attempted to solve the scale problem of Legacy proxies and VPNs, as the cloud managed gateways will auto scale, however it introduced new problems:

Performance—While the cloud is better suited for distributed client terminals due to many Point-Of-Presence, the architecture created a new problem: each and every request that is sent to gateways is decrypted in the cloud, verified and then encrypted again, and then being sent to the connector. While this operation may seem negligible, it becomes very expensive when millions of concurrent requests occur.

Security—While moving the decision point to the cloud sounds seemed to be a good design, in practice, it just moved the same problem to another place. This resulted in creating a single point of failure and compromise in the cloud that is a prime target for attackers, as in one target in which the attackers take over, they can: see all of traffic of every customer of the vendor, initiate communication to any destination in the customers network as the cloud controls the policy, and/or retrieve secrets and/or tokens of end users.

The aforementioned architecture basically breaks some the most basic foundations of the Zero-Trust approach, for example: Never trust—but trust me, always verify—but don't verify my requests, and assume breach—but don't assume that I will get breached. This leads to a weak Defense-In-Depth model in which there is only one layer of defense in the Cloud and the customer perimeter is trusting it blindly.

With respect to users access internet resources: Just like migrating the VPN to the cloud, vendors migrated their on premise secure web gateway (SWG) to the cloud. However, if migrating VPNs to the cloud solved the scalability problem, migrating SWG to the cloud just made this problem worse as it serves the complete opposite purpose. In the VPN scenario, users are distributed all over the world while the resources are centralized in the customer data centers (either on prem or cloud), therefore moving the gateway to a different auto scaled Point-Of-Presence in the cloud is a good design choice. However, SWGs were created in order to provide secure access from centralized users (located in the office) to distributed resources (in the internet), so having the SWG on prem near the exit point of the users to the internet is a good design choice.

For distributed users (e.g., working remotely) having a centralized exit node that in most cases will not be the fastest and most effective route to the resource. Such design compromises on performance and/or on security as the centralized gateways decrypts each and every request gaining full visibility on sensitive information while becoming once again a prime target for attackers.

With respect to users access software as a service (SaaS): Cloud Access Security Brokers (CASB) are enforcement points, placed between cloud service consumers and cloud service providers to combine and interject enterprise security policies as the cloud-based resources are accessed. The drawbacks of CASB as similar to the ones discussed above for SWG although less significant as less traffic is passing through them and the sensitivity of the services and data is much higher. However, CASBs deployment can be very technically challenging hard and may times may not provide the needed value.

CASBs operate with three different deployment models, each one of them might solve one use case, but will not handle another use case:

API mode—Available only for sanctioned enterprise applications. This mode can handle data at rest but doesn't offer real-time prevention.

Forward proxy mode—Can provide real time protection for sanctioned and unsanctioned applications. Can't handle data at rest and applies only to managed devices. SWG is generally utilized when working this method with support for a limited number of SaaS applications.

Reverse proxy mode—Can provide real time protection only for sanctioned apps. Works for unmanaged devices. However, most SaaS apps will not support this mode.

In summary, current implementations of CASBs don't provide holistic protection for all SaaS applications and customers find themselves compromising on security.

In contrast, at least one embodiment described herein addresses the technical challenges of a hybrid world where users can be anyone (e.g., employees and third parties), everywhere (e.g., on campus or remote) while working from any type of device (e.g., managed or unmanaged) and internal resources to be accessed can be anything (e.g., web applications, servers, complete networks) anywhere (e.g., on prem or cloud) public or private, with the core elements of the Zero-Trust model.

At least one embodiment described herein solves the aforementioned technical problem(s), and/or improves the aforementioned technical field(s), and/or improves upon the aforementioned technical approaches, and/or provides the practical application(s) of improved security for remotely accessing an internal resource, by providing a component designed for deployment in association with an internal resource hosted by a target computing environment, for securing remote access to the internal resource. The component publishes external routes to the internal resource hosted by the target computing environment. The external routes are published on a cloud platform in communication with the target computing environment. The cloud platform routes a request to the component according to the published external routes. The request is generated by a service computing environment (e.g., client terminal) for accessing the internal resource. The component authenticates and/or authorizes the request against an access policy managed by the component for accessing the internal resource. In response to the authentication and/or authorization, the component establishes a session according to the request, between the client terminal and the component managing the internal resource via the cloud platform. The session is run over an encrypted connection. Traffic is encrypted at the client terminal end. The cloud platform directs the encrypted traffic over the encrypted connection between the client terminal and the component without decryption at the cloud platform. The component decrypts the encrypted traffic received over the established session running on the encrypted connection.

Potential advantages of deploying the component described herein include:

User experience: User clicks on an internal resource (e.g., application) from an internal resource portal and is provided with real-time access to the internal resource.

Authentication: User is authenticated against a selected IDP. The component may be integrated with multiple On-Prem and/or Cloud IDPs simultaneously Encryption: End-to-end encryption between users and the internal resource is provided without terminating data in the cloud platform.

Confidentiality: No private or sensitive data such as keys/password/policies/tokens is stored in the cloud platform.

Security: No open ports on a private site managed by the component. Connections are initiated from within a trusted boundary and allowed only for verified identities.

Adaptive: No need to change or install anything on the internal resources or on the client terminals of the users.

Visibility: Full visibility for each request including audit logs and session recording.

At least one embodiment described herein may relate to the next generation of SSE, providing full control and/or visibility while providing the best performance and/or user experience for the end user.

At least one embodiment described herein includes a component (also referred to herein as IDAC), which is designed as a software based enforcement point that lives near the internal resource (also referred to herein as private applications). The IDACs doesn't necessarily listen on any port and/or may be connected to a stateless cloud platform (e.g. computing cloud) that acts as a service mesh between the IDACs. This design allows the IDACs to interact with each other, for example, using mutual transport layer security (mTLS) or other suitable protocol. Data exchange and decision-making may be achieved through consensus processes. This architecture may make a platform more reliable and/or secure as there is no single point of failure and/or control.

The multiple components installed in one or more target computing environments for managing access to internal resources hosted by the target computing environment(s) which communicate with each other over the cloud platform, represent a decentralized architecture. In the decentralized architecture, there is no single point of failure. In response to failure of a certain component, another component located within the same target computing environment and/or located in another target computing environment may take over for managing remote access to the internal resources managed by the component that failed.

With respect to user to internal resources (private applications): When users try to access a private application, they may initiate a TLS channel with their nearest cloud platform Point-Of-Presence. The cloud platform, in contrast to other cloud designs, does not complete the TLS handshake with the user. Instead, the cloud platform performs for example server name indication (SNI) routing to the relevant IDAC through an inverse channel. The IDAC, as the enforcement point, may verify, for example, the user identity, the device identity and/or the access conditions (e.g., geo-fencing, multi-factor authentication (MFA), etc.) and/or the destination. After verifying that the access attempt is legitimate, the IDAC may proxy the request to the destination while enforcing an action profile (e.g., such as inline web application firewall (WAF), session recording, block file transfer, etc.).

In at least one embodiment, the architecture based on the component described herein is designed to provide end-to-end encryption from the user (i.e., client terminal) to the end point (i.e. component) that provides one or more of the following potential advantages:

Better security and privacy as the cloud platform can't be used as a point of compromise.

Faster performance as no overhead computation is performed in the cloud platform.

Better reliability as decisions are made near the internal resources

With respect to user to internet resources: A policy of whether to allow full, limited or no internet access while disconnected from the cloud platform, may be set. When a user connects to the cloud platform, the SWG definitions that will be evaluated on the device itself may be provided. Unlike other approaches that route all of traffic (related to access) to a centralized location where the traffic is terminated, in at least one embodiment the component is run locally within the target computing environment, which may result in better privacy as the data is not be decrypted outside the target computing environment. Improved performance may be obtained as no unnecessary roundtrip of the traffic is performed, and therefore the user is not impacted.

With respect to user to SaaS application: While SaaS applications can be treated as simple internet resources, fine-grained solution using an enterprise browser add-on may be provided. Unlike other approaches which shares IP addresses between different customers having it impossible for SaaS applications and Identity Providers to differentiate between different tenants, at least one embodiment described herein may leverage the IDACs as a one-to-one exit node to provide strong authentication for end users.

The aforementioned approach may verify that accessing the SaaS applications is made only from a trusted device. From that moment the end user can access the SaaS application using a browser, that now have enterprise capabilities, solving the drawbacks of Proxy mode CASBs with the option to discover and protect each SaaS application which may goes into the deepest levels of which operations users can do on which data.

A SaaS security posture management (SSPM) approach may be being used to provide full cover of security posture for each SaaS application.

In at least one embodiment, fine-grained policies may be applied based on each user, device and/or application. This is in contrast to other approaches where sophisticated controls sometimes lack with hard deployment.

At least one embodiment described herein is based on the IDAC which is designed to integrate with existing components such as identity providers and/or provides AI based discovery modules to discover different types of application and/or to shadow users. After the discovery mode, policies may be suggested based on the behavior of the users.

In at least one embodiment, administrators may manage and/or view data through an app centric dashboard, where each access decision may be identity based. Identities of end user connecting to the cloud platform and/or identities that are being used in order to connect to internal resources, make the cloud platform suitable for remote privileged access management (RPAM) and/or secure remote access (SRA) use cases as well by leveraging a vault on each IDAC.

The cloud platform described herein is designed to work in every type of architecture due to its stateless gateways, making it a suitable solution for cloud averse use cases. This results in one platform for both information technology (IT) and operational technology (OT) that protects every identity access to any application in any environment providing different access scenario, optionally while extending the SSE protection with identity security.

In at least one embodiment, full control and/or visibility is provided for each user, device, application, secret and/or operation, improving a user's experience by obtaining more value from existing endpoint security and existing extended detection and response (XDR) solutions.

At least one embodiment described herein addresses the technical problem of entities industrial networks often work with multiple third-party vendors who require remote access to perform key maintenance and support functions. These vendors typically:

Have their own established VPN solutions.

Connect via site-to-site VPNs to the OT organization's firewall.

Connect via a dedicated third-party 'HW getaway' located at the OT organization's LAN.

Are reluctant to install additional third-party agents.

Require organizations to install their own proprietary hardware solutions to provide remote support and maintenance.

Create visibility gaps and security challenges for the organization.

At least one embodiment described herein relates to seamless integration with third-party VPN solutions by positioning the component (i.e., IDAC) described herein as a VPN termination point. This architecture of positioning the component as the VPN termination point may enhance security, visibility, and/or control over remote third-party connections while eliminating or reducing the need for third-party vendors to install agents.

At least one embodiment described herein relates to a strategic positioning within the Purdue Model:

IDAC Placement: Positioned at Level 3.5 of the Purdue Model, serving as the secure access gateway to operational technology (OT) environments.

Private Gateway: Deployed at Level 4/5 or on the internet, functioning as a software router to intelligently route connections to a relevant IDAC.

Site-to-Site VPN: Creates secure tunnels between vendors' existing VPN solutions and IDACs.

Potential advantages of the component described herein are now discussed:

VPN Termination:

Acts as a termination point for any VPN connection

Eliminates the need for vendors to install agents

Maintains compatibility with existing VPN infrastructure

Vendor Hardware Gateway Integration

Connects to vendor-supplied hardware gateways deployed within an entity's network Monitors and controls remote engineer VPN access through these vendor gateways Provides visibility into vendor gateway connections that were previously unmonitored Eliminates security blind spots created by proprietary vendor hardware solutions Enhanced Visibility & Control Session Monitoring: Provides real-time visibility into vendor access sessions Termination Control: Enables immediate termination of any suspicious or unauthorized session Comprehensive Analytics: Generates detailed reports on access patterns, session duration, and activities Audit Trail: Provides complete records for compliance and security reviews Zero Trust Network Access (ZTNA)

Granular access controls to a specific application

Restricts access based on IP address, port, and session ID

Prevents lateral movement within sensitive networks

Enforces 'just-in-time' and 'just-enough' access principles

Technical Integration—Positioning the component as the VPN termination point may be used for integrating with major secure access service edge (SASE) and VPN vendors through:

Standard site-to-site VPN protocols

Seamless routing configuration

Minimal changes to existing infrastructure

Direct connections to vendor-supplied hardware gateways

Other potential advantages of positioning the component as the VPN termination point are summarized in the following table:

| For Security Teams | For Vendors | For Operations |
| --- | --- | --- |
| Complete visibility across third-party remote access sessions | Simplified access process | Streamlined vendor management |
| Ability to enforce security policies consistently | Continued use of preferred VPN solutions | Reduced friction in providing necessary access |
| Reduced attack surface and lessened risk of lateral movement | No additional agent installation required | Improved security posture without operational disruption |
| Comprehensive audit trail for compliance purposes | Consistent experience | Enhanced compliance capabilities |
| Visibility into previously unmonitored vendor gateway connections | Support for existing hardware gateway deployments | Centralized access management for vendor connections |

Exemplary use cases in which the component is positioned as the VPN termination point include:

Industrial Control System (ICS) Maintenance: Secure vendor access to critical OT systems Multi-Vendor Environment Management: Standardized security across diverse vendor connections Regulatory Compliance: Detailed audit trails for environments with strict compliance requirements Incident Response: Immediate connection termination capabilities during suspected security incidents Vendor Hardware Gateway Management: Secure monitoring of vendor-supplied hardware gateways that enable remote engineer VPN access to organization resources Positioning the component as the VPN termination point improves the technology of securing third-party remote access, by providing the security without disrupting established workflows and/or requiring vendors to change their existing connectivity methods.

At least one embodiment described herein improves upon the technology of SSE solutions, which are designed to ensure user-to-system connectivity but lack identity security for users and/or devices. The improvement is provided by integrating the component described herein with SSE technology. Exemplary potential advantages include:

Enhanced Security: strengthening zero trust with layered identity security.

Scalability and Performance: Eliminates reliance on central gateways.

Future-proof IT/OT Security: Bridges gaps between IT and OT environments for comprehensive protection.

Empowered for 3$^{rd}$ parties: Ensures secure and controlled access for external vendors, contractors, and partners without compromising internal systems.

At least one embodiment described herein provides identity security for users and/or devices.

At least one embodiment described herein addresses the technical problem of providing more resilient security to computational environments with remote workers, third parties, and/or distributed IT/OT resources. Existing approaches are based on centralized security. Issues with centralized systems include a single point of failure in cloud gateways increases security risk. Central processing may cause performance bottlenecks. At least one embodiment described herein solves the aforementioned technical problem by providing a decentralized architecture based on components described herein. The decentralized architecture enhances reliability by eliminating cloud dependency. Latency may be reduced. Zero trust principles are upheld. Single points of failure are eliminated or reduced. Data privacy with decisions made near resources are ensured.

At least one embodiment described herein improves upon existing approaches, such IT and OT gaps exist. Traditional SSE models struggle to seamlessly secure both IT and OT environments, leaving industrial systems vulnerable.

At least one embodiment described herein solves the aforementioned technical problem, and/or improves the aforementioned technical field, and/or improves upon the aforementioned existing approaches, and/or provides the practical application of, the component described herein.

In at least one embodiment, identity-first principles are embedded into access workflows.

At least one embodiment provides a unified platform for secure access across IT and OT environments.

The following are some exemplary features of at least one embodiment based on the component described herein:

Identity Security:

Password Vaulting: Securely manages and rotates credentials to prevent unauthorized access.

Strong Authentication: Verifies the identity of users and devices through advanced methods.

Audit and Compliance: Tracks and logs all access activities for comprehensive oversight.

Granular Authorization: Ensures precise access control for both users and devices, enforcing least-privilege principles.

ZTNA:

Native Access: Seamlessly integrates with existing infrastructure for direct access.

Application Access: Provides secure, controlled access to applications without exposing the network.

Agentless Access: Enables access without requiring additional software installation.

Data Loss Prevention (DLP): Protects sensitive data during access and usage.

RPAM:

Recording and Auditing: Captures session recordings and performs detailed audits for comprehensive forensic analysis.

Access Limitations: Restricts actions and access based on predefined policies, ensuring minimal risk during connectivity.

Workflows: Simplifies approval processes with policy-driven workflows, including supervisor approvals, for seamless and secure access.

JIT Access: just in time access for least privilege and reduced attack surface.

Exemplary use cases are now described:

1. Integration with SSE. Integrating the component with SEE may be done by adding:

Identity and device verification before server access.

Robust identity-driven enforcement.

Potential benefits include: enhanced operations agility and/or minimal performance impact.

2. Easy transition for end customers. Operates independently for scenarios without direct integration.

Potential benefits include: Architecture-agnostic design for flexible deployment, and/or minimal performance impact and/or simplified onboarding for faster implementation.

At least one embodiment described herein is designed to connect verified identities to private resources (e.g., applications), which is in contrast to standard approaches of connecting users to networks.

At least one embodiment based on the component described herein provides the following potential advantages:

Access Controls:

Multi-factor Authentication to confirm identity.

Single sign-on and password vault for password protection.

Device posture check for endpoint security.

End-to-End encryption and continuous authorization for true zero-trust.

Identity federation to seamlessly validate trust.

Connectivity Controls:

Onboard and offboard application entitlement.

Block risk actions.

Pinpoint access to specific applications.

Leverage existing tools to merge domains.

Control activity permissions.

Terminate connection once work is completed.

Better oversight controls:

Full audit trail and complete access logs.

Supervised access for approval and monitoring.

Session recording to ensure compliance.

Rapid disaster recovery for business continuity.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
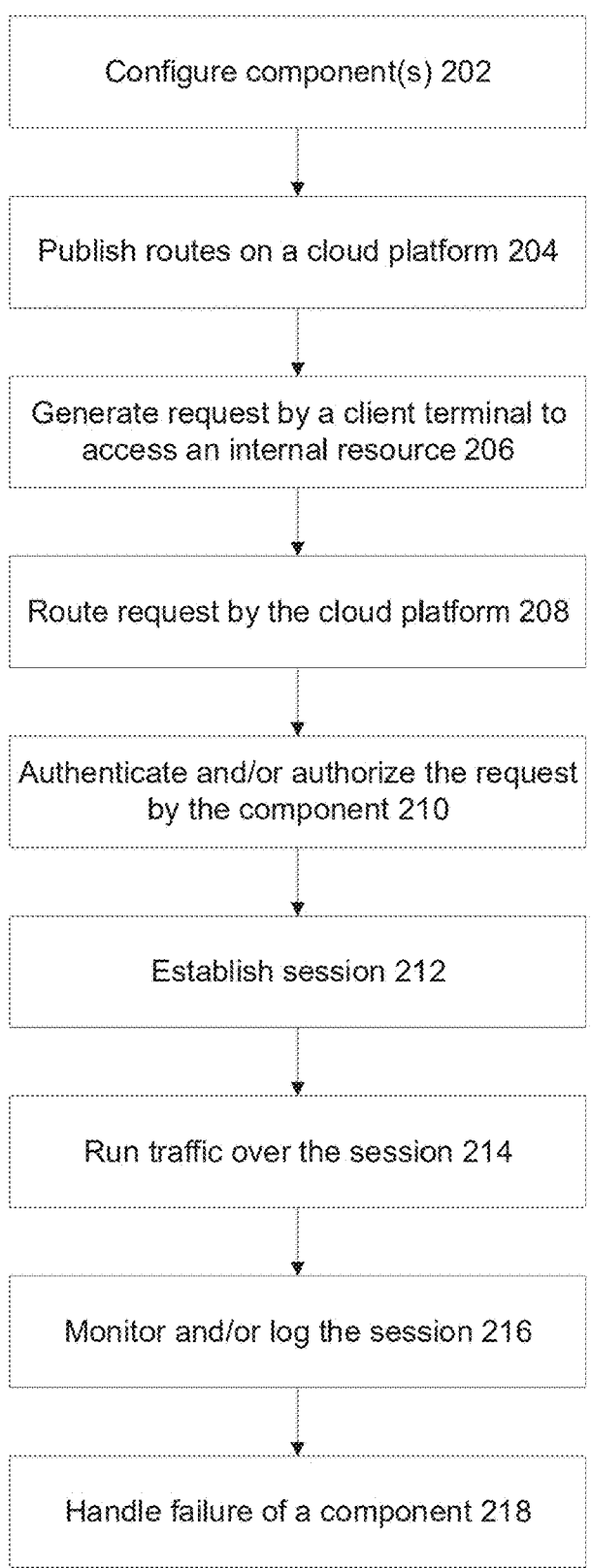
FIG. 2 is a flowchart of a method for using at least one component for providing secure access to at least one internal resource hosted by a target computing environment, in accordance with some embodiments of the present invention.
Figure 3:
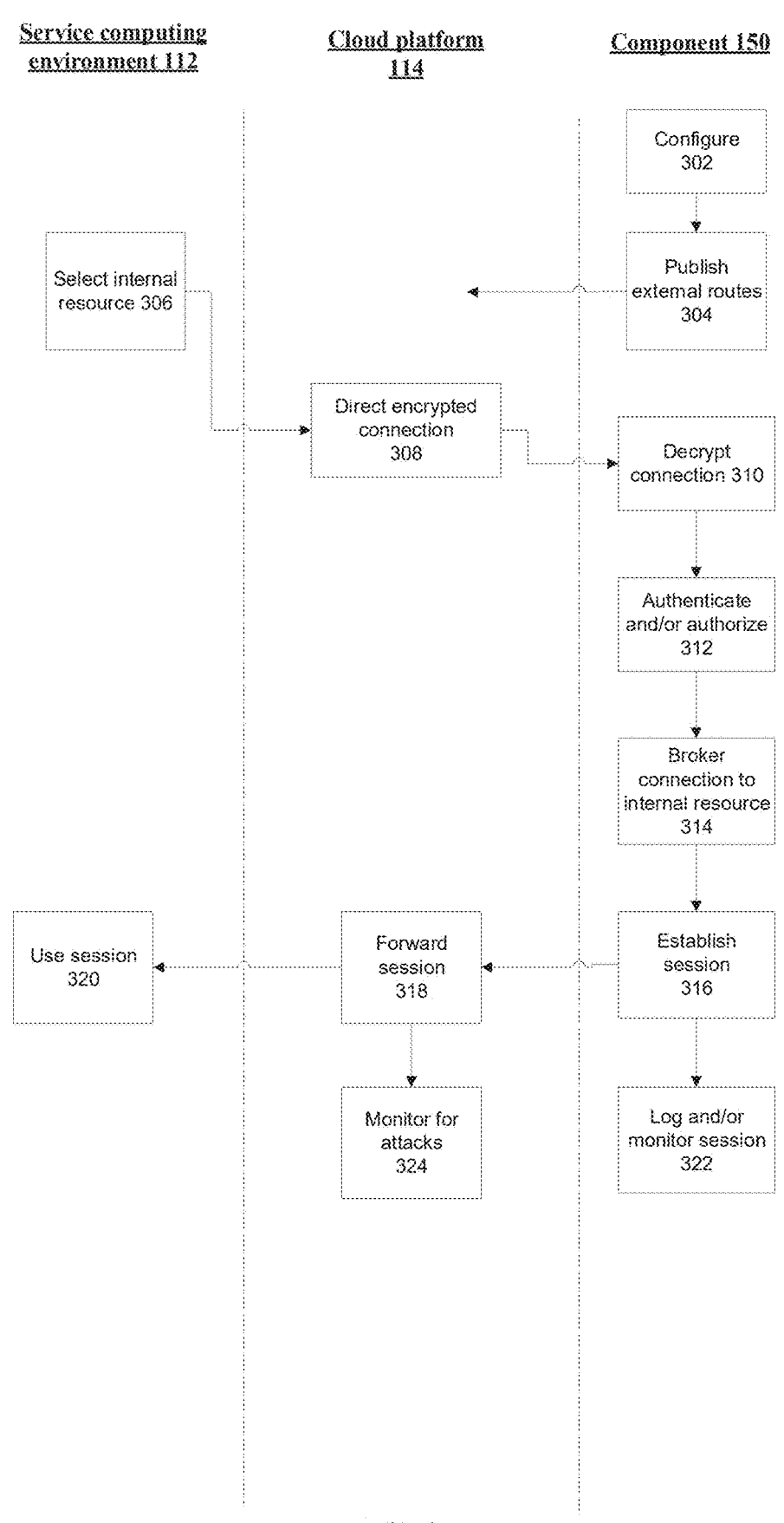
FIG. 3 is a sequence diagram of an exemplary flow between a service computing environment and a component managing access to an internal resource via a cloud platform, in accordance with some embodiments of the present invention.
Figure 4:
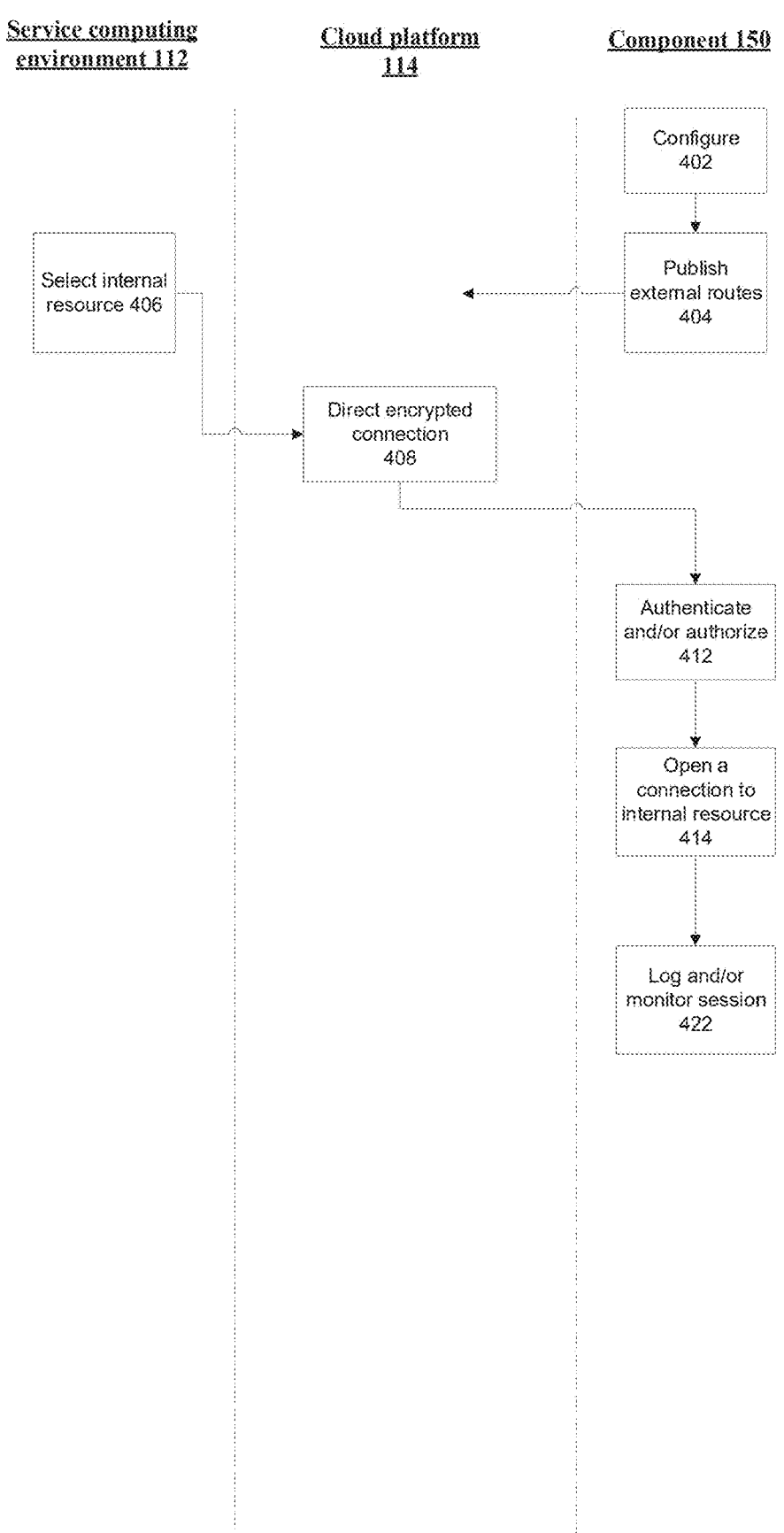
FIG. 4 is another sequence diagram of an exemplary flow between a service computing environment and a component managing access to an internal resource via a cloud platform, in accordance with some embodiments of the present invention.
Figure 5:
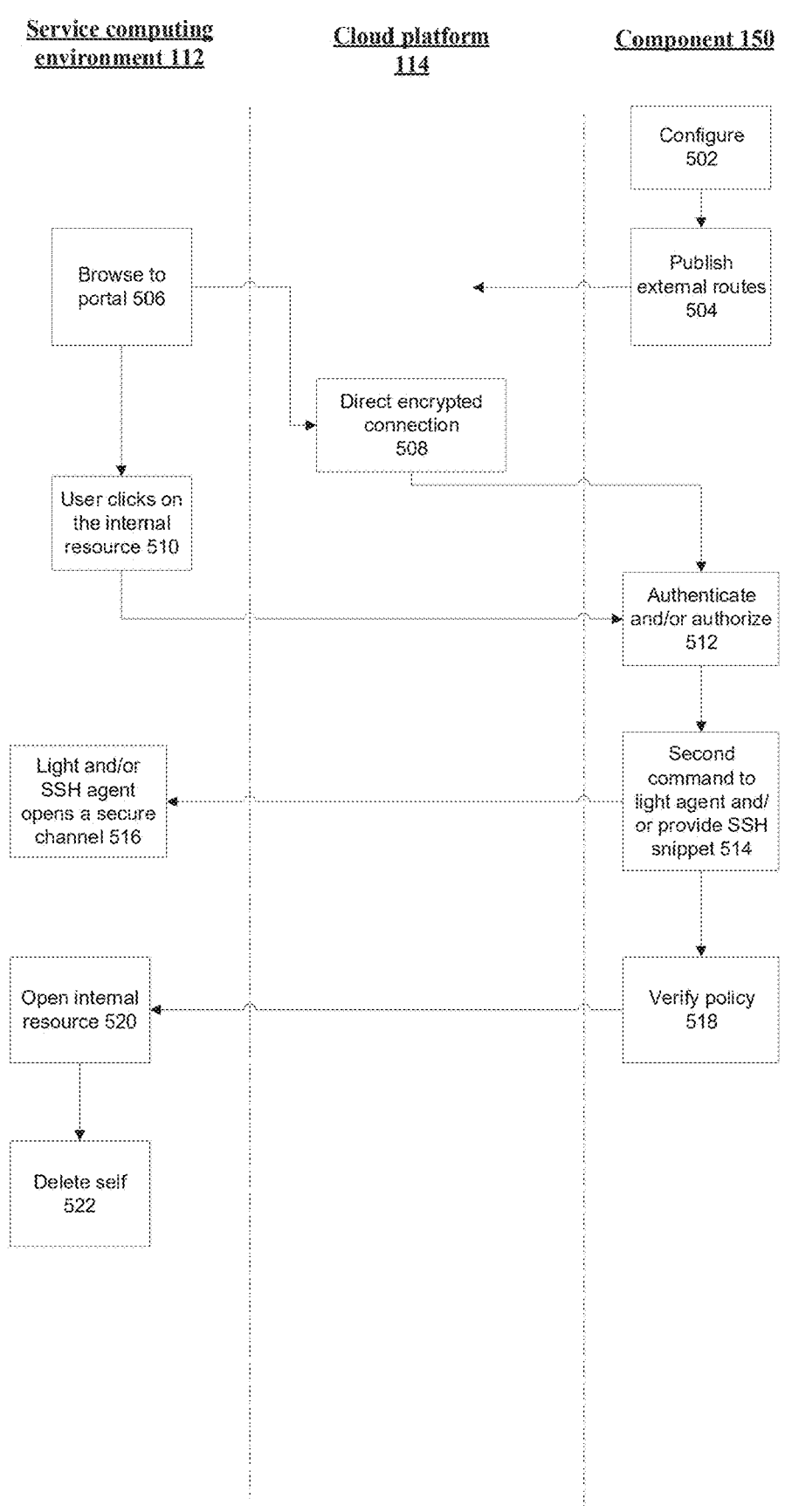
FIG. 5 is yet another sequence diagram of an exemplary flow between a service computing environment and a component managing access to an internal resource via a cloud platform, in accordance with some embodiments of the present invention.
Figure 6:
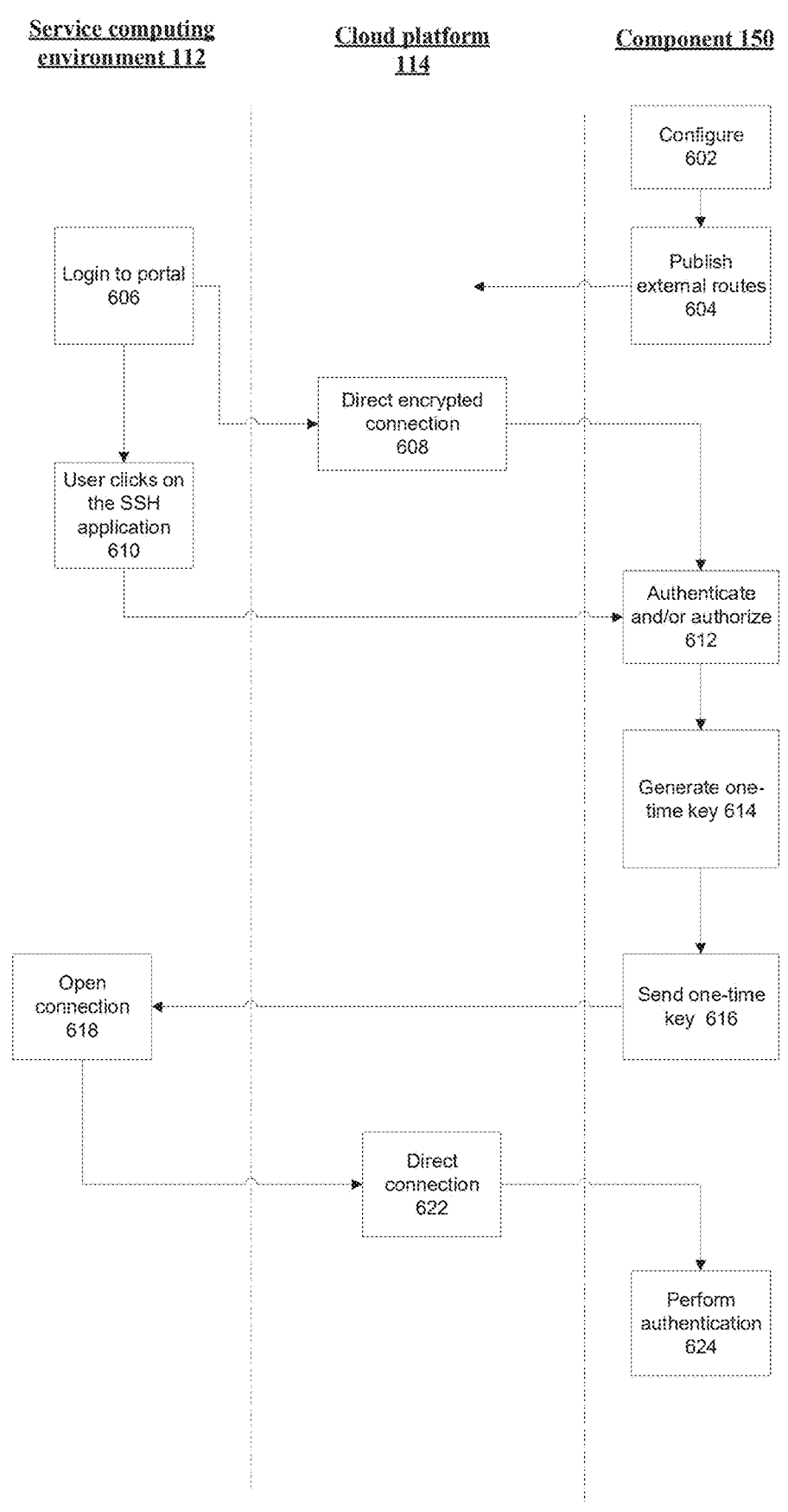
FIG. 6 is yet another sequence diagram of an exemplary flow between a service computing environment and a component managing access to an internal resource via a cloud platform, in accordance with some embodiments of the present invention.
Figure 7:
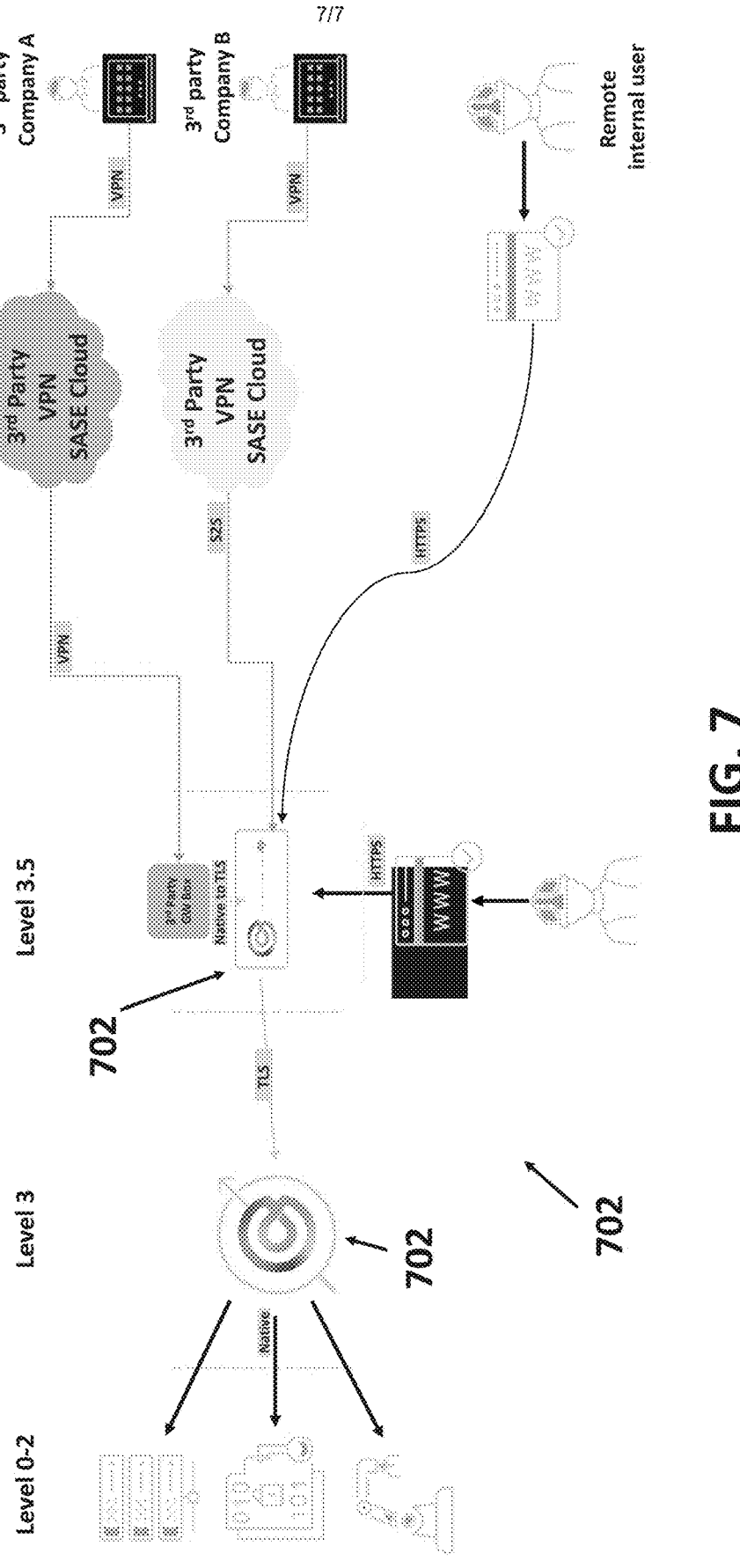
FIG. 7 is a schematic based on the Purdue Model indicating exemplary locations for deployment of the component, in accordance with some embodiments of the present invention.

Reference is now made to FIG. 1, which is a block diagram of components of a system 100 that includes at least one component 150 for providing secure access to at least one internal resource 152 hosted by a target computing environment 104, in accordance with some embodiments of the present invention. Reference is also made to FIG. 2, which is a flowchart of a method for using at least one component for providing secure access to at least one internal resource hosted by a target computing environment, in accordance with some embodiments of the present invention. Reference is also made to FIG. 3, which is a sequence diagram of an exemplary flow between a service computing environment and a component managing access to an internal resource via a cloud platform, in accordance with some embodiments of the present invention. Reference is also made to FIG. 4, which is another sequence diagram of an exemplary flow between a service computing environment and a component managing access to an internal resource via a cloud platform, in accordance with some embodiments of the present invention. Reference is also made to FIG. 5, which is yet another sequence diagram of an exemplary flow between a service computing environment and a component managing access to an internal resource via a cloud platform, in accordance with some embodiments of the present invention. Reference is also made to FIG. 6, which is yet another sequence diagram of an exemplary flow between a service computing environment and a component managing access to an internal resource via a cloud platform, in accordance with some embodiments of the present invention. Reference is also made to FIG. 7, which is a schematic 702 based on the Purdue Model indicating exemplary locations for deployment of the component, in accordance with some embodiments of the present invention.

System 100 may implement the acts of the method described with reference to Figures of the disclosure by processor(s) 102 of target computing environment 104 executing code instructions 106A stored in a memory 106 (also referred to as a program store).

Target computing environment(s) 104 hosts a component(s) 150, which manages remote access to an internal resource(s) 152 hosted by target computing environment(s) 104 and which is being accessed (or a request to access is generated) by service computing environment(s) 112.

Component(s) 150 may be implemented as, for example, code for storage on a memory 106 and executable by one or more processors 102 of target computing environment(s) 104. In other embodiments, component 150 (s) may be implemented as, for example, circuitry placed in communication with target computing environment(s) 104, for example, a hardware card inserted into a slot and/or an external component connected to an interface.

Component(s) 150 may be implemented as and/or may include, for example, an interface such as an application programming interface (API) and/or software development kit (SDK)), an application for local download to the service computing environment 112 and/or to client terminal(s) 108 for accessing target computing environment 104 and/or for providing a remote access session to the target computing environment 104, such as through a web browser executed by service computing environment 112 accessing a web site hosted by target computing environment 104 enabling remote access of internal resource(s) 152. For example, a user using client terminal 108 may use a web browser to access a portal, and click on an icon/link to access internal resource 152.

One or more component(s) 150 may be installed on a single target computing environment 104. Each component 150 may manage a different set of internal resources 152 hosted by the target computing environment 104. There may be multiple target computing environments 104, each with its own set of components 150. The component(s) 150 of the target computing environment(s) 104 may communicate with one another, forming a distributed network for management of access to internal resource(s) 152, as described herein.

Examples of internal resource(s) 152 include: databases for data storage and retrieval, files and/or documents for backup and/or shared work, web applications, and the like.

A target computing environment(s) 104 and/or a service computing environment(s) 112 may be implemented as, for example one or more and/or combination of: a computing cloud, a group of connected devices, a server, a virtual server, a client terminal, a virtual machine, a desktop computer, a thin client, a network node, and/or a mobile device (e.g., a Smartphone, a Tablet computer, a laptop computer, a wearable computer, glasses computer, and a watch computer).

One or more client terminals 108 may access (or request to access) internal resource(s) 152 hosted by target computing environment(s) 104 via service computing environment(s) 122 (e.g., implemented as a server, portal, gateway, and the like). In embodiments in which the client terminal(s) 108 access (or request) to access internal resource(s) 152 directly, service computing environment 112 refers to the client terminal(s) 108.

A connection session between client terminal(s) 108 and/or service computing environment and component(s) 150 passes through a cloud platform 114 via a network 110. Cloud platform 114 may be implemented as a computing cloud. Cloud platform 114 may execute one or more features 114A, for example, routing of encrypted traffic, monitoring of network level attacks against the encrypted session passing through the cloud platform, and others as described herein.

Optionally, service computing environment 112 and/or and target computing environment 104 are implemented as respective virtual private computing clouds. A virtual private cloud implementing service computing environment 112 may initiate a network connection, optionally a peer to peer network connection, with the virtual private cloud implementing target computing environment 104, for routing traffic using private IP addresses.

Processor(s) 102 of target computing environment 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to one or more Figures when executed by processor(s) 102.

Target computing environment 104 may include a data storage device 120 for storing data, for example, an access policy 120A for determining who is granted access to the internal resource, and/or an identity provider(s) 120B, as described herein. Data storage device 120 may be implemented as, for example, a memory, a local hard-drive, virtual storage, a removable storage unit, an optical disk, a storage device, and/or as a remote server and/or computing cloud (e.g., accessed using a network connection).

Computing environment 104 may include a network interface 130 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Network 110 may be implemented as, for example, the internet, a local area network, a virtual network, a wireless network, a cellular network, a local bus, a point to point link (e.g., wired), and/or combinations of the aforementioned.

Target computing environment 104 may include and/or is in communication with one or more physical user interfaces 132 that include a mechanism for a user to enter data (e.g., manually define the access policy 120A) and/or view data (e.g., view a log of a connection for accessing the internal resource). Exemplary user interfaces 132 include, for example, one or more of, a touchscreen, a display, a virtual reality display (e.g., headset), gesture activation devices, a keyboard, a mouse, and voice activated software using speakers and microphone.

Referring now back to FIG. 2, at 202, a component installed at a target computing environments is configured. The configuration may be performed, for example, manually by a user (e.g., administrator), automatically by code (e.g., machine learning model that analyzes the hosted internal resources and automatically configures the component), based on preset values (e.g., stored on a data storage device), and the like.

The component is designed for installation at the target computing environment, for example, deployment as code, has interfaces designed to integrate with the target computing environment, and the like.

Optionally, the component is configured for managing remote access for one or more internal resources hosted by the target computing environment. The internal resources which are managed by the component may be selected from multiple internal resources hosted by the target computing environment. There may be internal resources which are unmanaged by the component. Such internal resources may be defined as managed by another component.

The component may be configured for managing remote access per one or more of the following: per internal resource, based on user ID, based on device ID, for defined time, for defined location, and/or for a behavior and/or calculated risk.

Optionally, the component is associated with a certain identity provider which is used for authentication of requests, optionally of user identities associated with the request, as described herein. The identity provider may be selected from multiple identity providers which may be installed at the target computing environment and/or at external locations such as the cloud platform and/or at other target computing environments.

Optionally, multiple components are configured. The multiple components may be installed in multiple target computing environments. Each component may be configured to manage access for one or more internal resources hosed by the target computing environment in which the component is installed. Alternatively or additionally, multiple components may be installed in a single target computing environment. In such implementation, each component may manage remote access for a different set of internal resources hosted by the target computing environment in which the component is installed in.

Optionally, the multiple components are configured for communicating with each other. In implementations in which multiple components are installed in multiple target computing environments, the components may be set to communicate with each other via the cloud platform. In implementations in which multiple components are installed in the same target computing environment, the multiple components may be set to provide backup to one another (e.g., in case of failure) and/or to provide redundancy to the same set of internal resources (e.g., in case of high load such as high number of access requests) and/or to manage different sets of internal resources (e.g., each component manages its own set of internal resources).

Optionally, the multiple components are configured for performing data exchange and/or decision making via a consensus process.

The multiple components installed in one or more target computing environments for managing access to internal resources hosted by the target computing environment(s) which communicate with each other over the cloud platform, represent a decentralized architecture. In the decentralized architecture, there is no single point of failure. In response to failure of a certain component, another component located within the same target computing environment and/or located in another target computing environment may take over for managing remote access to the internal resources managed by the component that failed.

Optionally, two or more components associated with two or more different internal resources hosted by two or more different target computing environments are configured as VPN termination points. A VPN may be established between the components.

Optionally, the component (or two or more components) is designed and/or programmed (e.g., includes code for operating as) as a secure termination and routing point for providing a remote-access session for the client terminal for accessing the internal resource. The component is designed and/or programmed (e.g., includes code) for providing multiple remote-access sessions for multiple client terminals, for accessing the same internal resource and/or different internal resources. The client terminal may be operated by a third-party vendor. The component may establish the remote-access connection via at least one of: a VPN, a hardware gateway (e.g., dedicated hardware gateway for the client terminal such as for the third-party and/or other client terminals such as other third-parties), and a secure remote-access protocol. The component securely routes traffic originating from the client terminal (e.g., third-party vendor originating traffic) and/or securely routes traffic from the internal resource to the client terminal. Traffic may be exclusively routed through the component. The component is designed to establish the remote-access connection and/or to route the traffic without necessarily requiring installation of an additional software agent on the client terminal (e.g., on third-party vendor systems).

Optionally, the component includes code for automatically enforcing Layer 2 micro-segmentation within the target computing environment. The micro-segmentations may be defined for different internal resources hosted by the target computing environment, for example, each internal resource is associated with its own micro-segmentation.

The component may automatically enforce the micro-segmentations, by programmatically identifying access switch ports connected to internal hosts. The component may automatically configure one or more access switches of the identified access switch ports, for example, via a management interface and/or network protocol. The component may automatically configure the access switches to assign the identified host ports of the internal hosts to an isolated secondary VLAN within a Private VLAN (PVLAN) structure, for example, in accordance with RFC 3069. The configuration is selected to prevent direct Layer 2 communication between internal hosts. The component may further designate one or more uplink ports connected to the component as promiscuous ports of the PVLAN structure, such that all Layer 2 traffic originating from the isolated ports is forwarded to the component.

The component may further include to implement a Proxy ARP mechanism to respond to Address Resolution Protocol (ARP) requests issued by internal hosts on behalf of other internal hosts, thereby ensuring that intra-subnet communication is redirected to the component. The component may receive all intra-subnet Layer 2 traffic originating from the isolated ports via the promiscuous port, and apply one or more access control policies to each received packet. Based on the applied policy, the component may perform one or more of:

Forward the packet to the intended destination internal host if the policy permits.

Drop the packet if the policy denies communication between the internal hosts.

Optionally forward outbound traffic destined to external networks over an encrypted connection.

The component may be set for enforcing dynamic routing to the internal resource(s) and/or to external resource(s). The component may operate as a primary domain name system (DNS) resolver on the client terminal and/or within the service computing environment and/or within the target computing environment. A DNS resolution request issued by the client terminal for a domain name(s) is intercepted, optionally by the component. The component may determine whether the requested domain name and/or a subdomain matches a predefined rule and/or pattern defined by an access policy. In response to a match of the DNS resolution request with the rule and/or pattern, the component resolves the domain name to at least one internet protocol (IP) address. The component programmatically installs at least one host-specific IP route corresponding to the resolved at least one IP address into a routing table of the client terminal and/or a network element under control of the component.

The installation may be performed by dynamically injecting the host-specific IP route(s). The host-specific IP route(s) may include/32 routes for IPV4 addresses and/or/128 routes for IPV6 addresses. Traffic destined to the resolved IP address(es) is dynamically redirected through a secure tunnel established by the component.

An exemplary architecture and/or protocol(s) for communication between multiple components, which may be deployed in different target computing environments, is now described.

Some terms used herein with respect to the architecture are now defined:

Backend—an internal resource (e.g., application) visible through embodiments described herein.

IDAC—component described herein (e.g., an identity-aware inverse proxy).

Router—a meet-in-the-middle point for IDACs, users and other routers.

Upstream Router—a router which an IDAC or router talk to.

Root Router-a router that has no upstream.

The following are exemplary rules for connecting IDACs:

1. An IDAC must be connected to one and only one Upstream Router.

2. A Router may be connected to one Upstream Router.

The following is an exemplary protocol for communication between an IDAC and Router:

1. IDAC dials its Upstream Router and authenticates over, for example, mutual-TLS.

2. IDAC sends a list of the internal resources for which it is managing remote access over the authenticated connection to the Upstream Router.

3. The Upstream Router verifies the internal resources provided by the IDAC match the trusted IDAC client certificate(s).

4. If the Router has an Upstream Router configured:

i. Router dials its Upstream Router and authenticates, for example, over mutual-TLS.

ii. Router sends to its Upstream Router a list of the internal resources managed by IDACs connected to the router over the authenticated connection.

iii. The Upstream Router verifies the list of internal resources match the trusted Router client certificate(s).

The following is an exemplary protocol for communication between a client terminal and a Router:

1. The client terminal dials a Router

2. The Router reads the client terminal's request (e.g., Client Hello Message) and obtains an indication for routing the request to the component (e.g., the server name identification (SNI)).

If the SNI matches one of the authenticated (e.g., downstream) connections, the Router closes the circuit. Otherwise If the Router has an Upstream Router configured, the Router sends the user's request to the Upstream Router, and then the Upstream Router checks to see if it can find an appropriate Downstream Router for routing the request. Otherwise The Router sends a TLS alert and/or terminates the connection.

At 204, external routes to the internal resource(s) hosted by the target computing environment may be published on the cloud platform. The external routes may be published by the component. Optionally, each component publishes its own external routes to the internal resources it is managing.

The cloud platform is in communication with the target computing environment(s) hosting the internal resource(s), and is accessible by client terminals that are requesting access to the internal resource(s).

The external routes are used by the cloud platform to direct traffic between the client terminal and the internal resource(s), for example, for requesting access by the client terminal to the internal resource and/or for forwarding data over a communication session setup between the client terminal and the component in response to the request.

At 206, a request for accessing an internal resource is generated by a client terminal.

The internal resource may be selected by the client terminal from multiple available internal resources. For example, icons indicating the multiple available internal resources are presented within an application portal on a display of the client terminal. A user may select the internal resource by clicking on its icon. The request may be generated in response to the click. Access to the internal resource may be established in response to the click, as described herein. The client terminal (e.g., the user thereof) may be placed in a waiting room, where upon approval the client terminal (e.g., the user thereof) is redirected to the internal resource.

The request may be associated with an identity of a specific user. In some embodiments verified identities are connected to specific internal resources (e.g., applications), in contrast to standard approaches which connect a user to a network. The identity is linked to a specific person. Each identity is associated with only one real human. In contrast, a user may be associated with multiple identities. For example, multiple identities may all have the same credentials (e.g., Admin 1), where each identity may use the same credentials (e.g., including password) to log in.

At 208, the cloud platform routes the request according to the published external routes. The request is routed to the component managing the internal resource to which access is being requested.

Private and/or sensitive data is excluded from being hosted by the cloud platform, i.e., the cloud platform does not host private and/or sensitive data. The private and/or sensitive data is hosted by the component and/or hosted by the target computing environment.

At 210, the request for accessing the internal resource is authenticated and/or authorized by the component.

The request may be authenticated and/or authorized against an access policy managed by the component.

The authentication may be performed against the selected identity provider defined by the component. The identity providers may be installed at the target computing environment and/or installed at the computing platform. Different requests for different internal resources are authenticated by different identity provides as defined by the corresponding component managing the respective internal resource(s).

At 212, a remote access session is established according to the request.

The session is established in response to successful authentication and/or authorization.

The session is established between the client terminal and the component managing the resource.

The session is established via the cloud platform.

Optionally, network ports of the component are generally maintained in a closed. The maintenance of the ports in the closed state helps secure that component against attack by external entities. The ports may be opened in response to the authentication and/or authorization for establishing the session.

The session may be established over an encrypted connection.

At 214, data (e.g., traffic) is sent between the component associated with the internal resource and the client terminal via the remote access session running over the encrypted connection.

For data being sent from the client terminal to the component, encryption of the data may be performed at the client terminal. The encrypted data is directed by the cloud platform to the component. The encrypted data is directed without being decrypted at the cloud platform. Avoiding decryption by the cloud platform improves computational efficiency of the cloud platform (e.g., in comparison to designs that decrypt and encrypt the data by the cloud platform) and/or improves security (e.g., since sensitive data is not exposed at the cloud platform). The decryption is performed by the component at the target computing environment.

For data of the internal resource being sent from the component to the client terminal, the component encrypts the data and the client terminal may decrypt the data. No encryption/decryption is performed at the cloud platform.

Optionally, the component is associated with at least one software-defined routing component positioned externally to the component. Each component may be associated with the at least one software-defined routing component. The software-defined routing component includes code to dynamically route incoming remote access connections from at least one of: the VPN, the hardware gateway, and/or remote-access protocols. The software-defined routing component may dynamically route the incoming access connections directly to one or more relevant components based on one or more of: predefined routing rules, connection attributes, policies, and/or session characteristics managed and/or enforced by the component.

At 216, the component may monitoring and/or log the established session. The monitoring and/or logging may be performed continuously. For example:

Session Recording—Captures user activities during remote access for auditing and forensic analysis.

Real-time Monitoring—Tracks active sessions, user actions, and access patterns to detect anomalies.

Log Collection & Storage—Stores authentication events, commands executed, and resource interactions for compliance.

Anomaly Detection—Uses AI or rule-based systems to flag unusual behaviors, such as access from unknown locations.

Alerting & Reporting—Sends notifications for suspicious activities and generates reports for audits and security reviews.

The cloud platform may monitor for network level attacks against the encrypted session passing through the cloud platform.

Optionally, the component includes code for monitoring and/or logging and/or providing real-time visibility and/or granular administrative control over the remote-access session originating from the client terminal (e.g., third-party vendor). The monitoring and/or logging and/or visibility may be provided continuously while the remote-access sessions is operating. Real-time visibility may be provided, for example, to an automated process such as an anti-malware application monitoring for malicious activity, and/or for presentation on a display of an administrative server (e.g., for viewing by a network administrator).

Optionally, the component includes code for enforcing access control policies based on Zero Trust Network Access (ZTNA) principles, for example, limiting remote access exclusively to authorized internal resources, applications, IP addresses, ports, session identifiers, user identities.

The component may include code for enabling proactive and/or immediate termination of unauthorized and/or suspicious remote-access sessions. The termination may be in response to the monitoring of the remote-access session, such as when malicious activity and/or otherwise suspicious abnormal activity is detected, for example, by an anti-malware application and/or other suitable process.

At 218, in an architecture of multiple components communicating with each other via the cloud platform, failure of a component managing access to a certain internal resource may be automatically managed by triggering another component for taking over the functions of the component that failed. The other component performs the functions, for example, the authenticating and/or authorizing for establishing the session for the internal resource.

Some examples of use cases based on the flow described with reference to FIG. 2 are now provided.

One use case example is based on SSH (Secure Shell). A client terminal may click on a SSH application. A SSH client is opened in response to the click. A connection to an internal SSH server hosted by the target computing environment is established. The component provides a SSH snipet in response to the authentication and/or authorization. A SSH agent running on the client terminal opens a secure channel, opens the internal resource, and deletes itself in a run-once scenario.

Another use case based on SSH is now described. A client terminal may click on a SSH application. In response to the click, the component verifies the policy and presents a one-time key generated from a server key and a session key. The component sends the one-time key to the cloud platform. The client terminal opens a connection from a native client running on the client terminal and provides the one-time key. The cloud platform directs the connection based on the server key. The component performs authentication based on a predefined configuration.

Referring now back to FIG. 3, service computing environment 112, cloud platform 114, and component 150, are for example, as described herein and/or with reference to FIG. 1. One or more features of the flow described with reference to FIG. 3 may be based on, integrated with, and/or be alternatives to, the follow described with reference to FIG. 2.

At 302, the component is configured, for example, by an administrator. The following may be defined for the component: the internal resource(s) for which remote access is being managed by the component, a single sign on (SSO) method, and/or the access policy used to authorize and/or authenticate.

At 304, the component publishes the external routes on the cloud platform.

At 306, a user may use their client terminal to browse to the internal resource, optionally to the URL of the internal resource. The browsing may be, for example, directly or via a users portal which may be hosted by different servers.

At 308, the cloud platform directs an encrypted connected based on the requested SNI without decrypting the traffic.

At 310, the component decrypts the traffic.

At 312, the component authenticates and/or authorizes the request (e.g., the user) against the access policy.

At 314, the component brokers the connection to the internal resource.

At 316, the comment establishes the session.

At 318, the computing platform forwards traffic over the session.

At 320, the client terminal (i.e., the user thereof) uses the session to access the internal resource.

At 322, the component continuously monitors the session.

At 324, the cloud platform continuously monitors for network level attacks.

Referring now back to FIG. 4, the sequence diagram may be for a use case of a third party attempting to remotely access the internal resource. Service computing environment 112, cloud platform 114, and component 150, are for example, as described herein and/or with reference to FIG. 1. One or more features of the flow described with reference to FIG. 4 may be based on, integrated with, and/or be alternatives to, the follow described with reference to FIG. 2 and/or FIG. 3.

At 402, the component is configured, for example, by an administrator. The following may be defined for the component: the internal resource(s) for which remote access is being managed by the component, and/or a single sign on (SSO) method.

A supervisor process may be configured for the internal resource.

At 404, the component publishes the external routes on the cloud platform.

At 406, a third party (e.g., supplier) user may use their client terminal to browse to a portal of internal resources (e.g., applications). The supplier may click on the requested internal resource.

At 408, the cloud platform directs an encrypted connected based on the requested SNI without decrypting the traffic.

At 412, the component authenticates and/or authorizes the request (e.g., the user) against the access policy and sends a notification to the supervisor process.

At 414, upon approval the component opens a connection to the requested internal resource.

At 416, upon approval, the component establishes the session.

At 418, the computing platform forwards traffic over the session.

At 420, the client terminal (i.e., the user thereof) uses the session to access the internal resource.

At 422, the component continuously monitors and/or records the session.

Referring now back to FIG. 5, the sequence diagram may be for a use case based on SSH which provides the user experience of the user clicking on a SSH application (or other internal resource) which opens a SSH client with a connection to the internal SSH server. Service computing environment 112, cloud platform 114, and component 150, are for example, as described herein and/or with reference to FIG. 1. One or more features of the flow described with reference to FIG. 5 may be based on, integrated with, and/or be alternatives to, the follow described with reference to FIG. 2 and/or FIG. 3 and/or FIG. 4.

At 502, the component is configured, for example, by an administrator. The following may be defined for the component: server and/or a default internal resource(s) for which remote access is being managed by the component.

At 504, the component publishes the external routes on the cloud platform.

At 506, a user may use their client terminal to browse to a portal of internal resources (e.g., applications).

At 508, the cloud platform directs an encrypted connected based on the requested SNI without decrypting the traffic.

At 510, the user may click on the internal resource.

At 512, the component authenticates and/or authorizes and/or verifies the policy.

At 514, the component sends a message to a light agent and/or provides a SSH snippet.

At 516, in response to receiving the message, the light and/or SSH agent opens a secure channel.

At 518, the component verifies the policy.

At 520, the light agent opens the internal resource (e.g., default internal resource) with the relevant parameters.

At 522, the light agent deletes itself in a run-once scenario.

Referring now back to FIG. 6, the sequence diagram may be for a use case based on SSH which provides the user experience of the user clicking on a SSH application (or other internal resource) which provides a host and credentials. The user connects via their native client. Service computing environment 112, cloud platform 114, and component 150, are for example, as described herein and/or with reference to FIG. 1. One or more features of the flow described with reference to FIG. 5 may be based on, integrated with, and/or be alternatives to, the follow described with reference to FIG. 2 and/or FIG. 3 and/or FIG. 4 and/or FIG. 5.

At 602, the component is configured, for example, by an administrator. The following may be defined for the component: the SSH server and/or a single sign on (SSO) method.

At 604, the component publishes the external routes on the cloud platform.

At 606, a user may use their client terminal to login to a portal of internal resources (e.g., applications).

At 608, the cloud platform directs an encrypted connected based on the requested SNI without decrypting the traffic.

At 610, the user may click on the SSH application (or other internal resource).

At 612, the component authenticates and/or authorizes and/or verifies the policy.

At 614, the component presents a one-time key that is generated from a server key and a session key.

At 616, the component sends the one-time key to the computing cloud.

At 618, a user opens a connection from their native client and provides the one-time key.

At 620, the computing cloud directs the connection based on the server key.

At 624, the component performs authentication based on the configured SSO from feature 602.

Referring now back to FIG. 7, schematic 702 is based on the Purdue Model, indicating exemplary locations for deployment of the component. Component 704 may be positioned at level 3.5 of the Purdue Model, serving as the secure access gateway to operational technology (OT) environments. Alternatively or additionally, component 706 may be positioned at level 3. The component may be implemented as a VPN termination point, as described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant components and computing environments will be developed and the scope of the terms component and computing environment are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for providing secure remote access to an internal resource hosted by a target computing environment, comprising:

at least one processor executing code of a component designed for installation at the target computing environment, comprising instructions for:

publishing on a cloud platform in communication with the target computing environment, external routes to the internal resource hosted by the target computing environment, wherein the cloud platform routes a request to the component according to the published external routes, the request generated by a client terminal for accessing the internal resource;

authenticating and/or authorizing the request against an access policy managed by the component for accessing the internal resource;

in response to the authentication and/or authorization, establishing a remote access session according to the request, between the client terminal and the component managing the internal resource via the cloud platform over an encrypted connection; and decrypting traffic received over the established remote access session running on the encrypted connection; and at least one router configured for communication with at least one component, and at least one upstream router configured for communication with at least one component and/or router, wherein each component is configured for communication with a single upstream router and a router is configured for communication with a single upstream router;

wherein each respective router sends a list of internal resources being managed by the respective router to the upstream router for which the respective router is configured to communicate with, wherein each upstream router verifies the internal resources sent by each respective router.

2. The system of claim 1, wherein the cloud platform directs the encrypted traffic over the encrypted connection between the client terminal and the component of the target computing environment without decryption at the cloud platform, wherein decryption is performed by the component at the target computing environment.

3. The system of claim 1, wherein data from the internal resource for sending over the established remote access session running on the encrypted connection is encrypted by the component without encryption occurring at the cloud platform.

4. The system of claim 1, wherein the component is configured for managing remote access for individual internal resources.

5. The system of claim 1, wherein the request is associate with an identity of a specific user, and the authenticating and/or authorizing is for the identity associated with the request.

6. The system of claim 1, wherein the cloud platform monitors network level attacks against the encrypted connection passing through the cloud platform.

7. The system of claim 1, wherein the request is generated in response to a click on the internal resource presented within an application portal on a display of the client terminal, and wherein access to the internal resource is established in response to the click.

8. The system of claim 1, wherein the authentication is performed against a selected identity provider of a plurality of identity providers defined by the component, the plurality of identity providers installed at the target computing environment and/or installed at the cloud platform, wherein different requests for different internal resources are authenticated by different identity provides as defined by the component.

9. The system of claim 1, wherein private and/or sensitive data is hosted by the component and/or hosted by the target computing environment and excluded from being hosted by the cloud platform.

10. The system of claim 1, wherein the component is configured for managing access to at least one internal resource hosted by the target computing environment.

11. The system of claim 1, further comprising continuously monitoring and/or logging the established remote access session by the component.

12. The system of claim 1, wherein network ports of the component are maintained in a closed and opened in response to the authentication and/or authorization for establishing the remote access session.

13. The system of claim 1, further comprising a plurality of components installed in a plurality of target computing environments hosting a plurality of internal resources, wherein the plurality of components communicate with each other via the cloud platform.

14. The system of claim 13, further comprising at least one router configured for communication with at least one component, and at least one upstream router configured for communication with at least one component and/or router, wherein each component is configured for communication with a single upstream router and a router is configured for communication with a single upstream router.

15. The system of claim 14, wherein a router receives the request from the client terminal and obtains an indication for routing the request to the component and closes a circuit in response to server name indication (SNI) matching an authenticated connection, or the router sends the request to the upstream router and the upstream router checks for a router to route the request, or the router terminates the connection when no router to route the request is found.

16. The system of claim 13, wherein data exchange and/or decision making between the plurality of components are performed via a consensus process.

17. The system of claim 13, wherein in response to failure of a first component of the plurality of internal resources managing access to the internal resource, a second component configured in association with the internal resource is triggered for taking over functions of the first component for performing the authenticating and/or authorizing and for establishing the remote access session for the internal resource.

18. The system of claim 13, wherein at least two components of the plurality of components are associated with at least two different internal resources on at least two different target computing environments, the at least two components are configured as VPN termination points, and a VPN is established between the at least two components configured as VPN termination points.

19. The system of claim 1, wherein for each respective router configured for communication with an upstream router, the router sends to the upstream router a list of internal resources managed by components configured to communicate with the respective router, wherein the upstream router verifies the list of internal resources.

\* \* \* \* \*